United States Patent [19]
Koch

[11] 3,828,736
[45] Aug. 13, 1974

[54] METHOD AND APPARATUS FOR OPERATING COMBUSTION ENGINES

[75] Inventor: Christian Koch, Erlangen, Germany

[73] Assignee: Siemens Aktiengesellschaft, Berlin, Germany

[22] Filed: Jan. 18, 1972

[21] Appl. No.: 218,696

[30] Foreign Application Priority Data
Jan. 22, 1971 Germany............................ 2103008

[52] U.S. Cl................. 123/3, 123/1 A, 123/119 A, 123/119 E, 60/299
[51] Int. Cl......................................... F02m 25/06
[58] Field of Search.... 123/119 E, 191 A, 3, 119 A; 60/299

[56] References Cited
UNITED STATES PATENTS

| | | | |
|---|---|---|---|
| 1,630,048 | 4/1927 | Balachowsky et al. | 123/119 E |
| 1,777,554 | 10/1930 | Ducloux | 123/119 E |
| 1,795,037 | 3/1931 | Portail | 123/119 E |
| 1,834,818 | 12/1931 | Balachowsky et al. | 123/119 E |
| 1,857,565 | 5/1932 | Pahl et al. | 123/119 E |
| 2,206,685 | 7/1940 | Balachowsky | 123/119 E |
| 3,049,874 | 8/1962 | Morrow et al. | 123/191 A X |
| 3,065,595 | 11/1962 | Gary | 60/299 |
| 3,255,123 | 6/1966 | Haersel | 60/299 |

FOREIGN PATENTS OR APPLICATIONS

| | | | |
|---|---|---|---|
| 106,448 | 2/1939 | Australia | 123/119 E |
| 659,684 | 2/1929 | France | 123/119 E |

*Primary Examiner*—Wendell E. Burns
*Attorney, Agent, or Firm*—Herbert L. Lerner

[57] ABSTRACT

Method and apparatus for the combustion of a fuel, free of detrimental substances, in a combustion engine. The fuel, together with oxygen containing gas, is passed over a catalyst for conversion into a gas mixture of methane and carbon monoxide. Passing the gas mixture together with additional oxygen containing gas to the combustion engine whereat the gas mixture is burned producing an exhaust gas. Feeding part of the exhaust gas to the fuel, prior to the conversion of the fuel.

14 Claims, 1 Drawing Figure

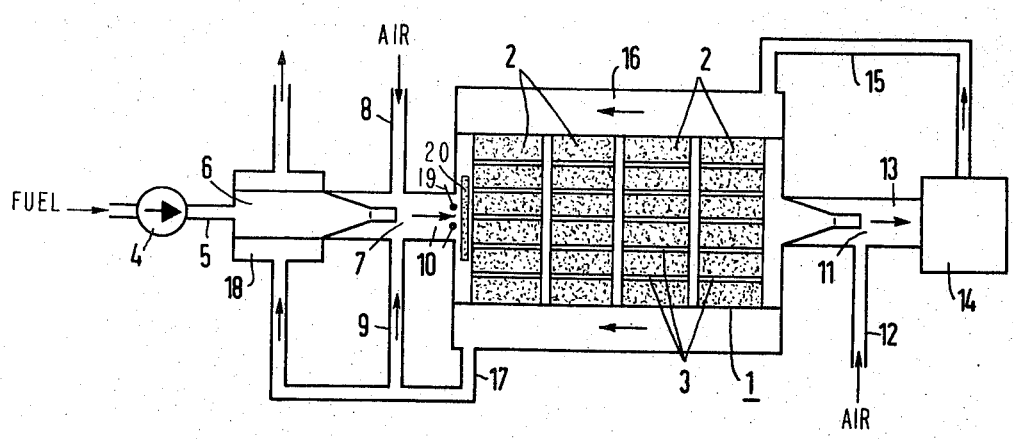

METHOD AND APPARATUS FOR OPERATING COMBUSTION ENGINES

The invention concerns a method for the operation of combustion engines and apparatus for carrying out this method.

Combustion engines are generally operated with fuels which, in order to obtain a high octane number, have a certain content of cyclic hydrocarbons and/or additives such as lead compounds. While these substances assure a high quality of the fuels and improve their combustion properties, their use also entails disadvantages and not inconsiderable danger. These substances constitute a source of air and environment polution and, in particular, cause the appearance of substances injurious to health, in the exhaust gases of the combustion engines.

It is an object of the invention to avoid the mentioned disadvantages in the operation of combustion engines, i.e., to reduce particularly the danger of air and environment polution and to prevent the presence of substances injurious to health in the exhaust gases.

This is achieved by the invention by passing a fuel free of detrimental substances over a catalyst, at elevated temperatures, to convert the fuel to a gas mixture containing methane and carbon monoxide, while adding oxygen containing gas required for conversion without the formation of carbon black. The gas mixture obtained in this conversion is fed to the combustion engine, together with fresh air, and is burned in the engine. A part of the exhaust gases produced in the combustion engine is recycled to the fuel, free of detrimental substances, prior to its conversion at the catalyst.

Fuels free of detrimental substances are understood to be fuels which contain no additives and are in particular lead free, contain no cyclic hydrocarbons or only a very low percentage of such hydrocarbons, and have a low sulfur content of less than about 10 parts per million. A low percentage of cyclic hydrocarbons is understood to be one which does not exceed the percentage normally present in conventional distilled gasolines.

The method according to the invention requires no fuels to which additives have been admixed for the purpose of increasing the octane number, but on the contrary makes it possible to use fuels of low octane number, for instance, fuels with an octane number of about 40.

According to the method of the invention, the fuel free of detrimental substances is passed over a catalyst for conversion into a gas mixture containing methane and carbon monoxide, adding oxygen containing gas required for the conversion, free of carbon black, advantageously at a temperature of 300° to 500° C. Fresh air can advantageously be added to the fuel prior to the catalytic conversion. The gas mixture obtained in the catalytic conversion is fed to the combustion engine and is burned there. Part of the exhaust gases produced in the combustion is fed back to the fuel, free detrimental materials. Advantageously, the temperature required for the catalytic conversion for the fuel is supplied by utilizing the heat content of the exhaust gases. The energy for maintaining the temperature at the catalyst can, however, also be supplied by additional devices, for instance, a gasoline burner, the exhaust gases of which are used to maintain the temperature.

Advantageously used as the catalyst for the conversion of the fuel is a nickel catalyst, a platinum catalyst or a nickel-platinum mixed catalyst. The nautre of the catalyst must in each case be such that it makes possible, the conversion of the fuel into a gase mixture consisting largely of methane and carbon monoxide. Advantageously, nickel sponge serving as the methanizing catalyst can be used. Nickel sponge is nickel with a large active surface, which does not sinter together at the temperature prevailing at the catalyst. The advantage of the gas mixture produced in the conversion at the catalyst, which contains almost exclusively methane and carbon monoxide as the combustible gases, is that a fuel with an octane number of over 100, and in the range of about 110, is thereby fed to the combustion engine itself. The combustion engine can, thereby, be operated with an antiknock fuel, but not at the expense of tolerating detrimental substances.

The catalyst used for the conversion of the fuel can be advantageously doped with uranium. The doping particularly maintains the active centers in the catalyst.

The invention will be explained in further detail with the aid of the Drawing and several embodiment Examples.

The FIGURE schematically illustrates, in cross section, a preferred embodiment of a device for carrying out the method of the invention. The catalyst is contained in a porous catalyst carrier, which is arranged in a catalyst chamber 1. The catalyst carrier can consist, advantageously, of one or several highly porous sintered stones 2, which have a multiplicity of passage openings 3, being arranged approximately parallel to each other. The fuel is fed by pump 4, via a pipeline 5 to an evaporator 6 ahead of the entrance of the catalyst chamber 1. A mixing nozzle 7, for mixing the evaporated fuel with the oxygen containing gas is at the evaporator 6. Fresh air can be fed to the mixing nozzle 7, via a pipeline 8. A part of the exhaust gases of the combustion engine through pipeline 9 is fed to the evaporated fuel at mixing nozzle 7. The fuel gas mixture flows, through a pipeline 10, to the catalyst chamber 1, in which the fuel is converted into a gas containing methane and carbon monoxide. Located at the output of the catalyst chamber 1 is a further mixing nozzle 11 for mixing the gas mixture, obtained by the conversion of the fuel at the catalyst, with fresh air fed to the mixing nozzle 11 via pipeline 12. The mixture obtained in this manner flows through pipeline 13 to the combustion engine 14, for instance an internal combustion engine or a gas turbine, and is burned thereat. The exhaust gases are discharged from the combustion engine 14 via a pipeline 15 and recycled into a heat exchanger 16 which is attached to the catalyst chamber 1. The exhaust gas leaves the heat exchanger 16 via pipeline 17. Part of the exhaust gas is then fed via pipeline 9 to the mixing nozzle 7. The main part enters heat exchanger 18, which is attached to the evaporator 6. In heat exchanger 16, the heat content of the exhaust gas is utilized for maintaining the temperature required at the catalyst. The heat exchanger 18 utilizes the exhaust heat for evaporating the fuel.

In a catalyst chamber, with inside dimensions of approximately 80 mm × 80 mm × 215 mm, the catalyst carrier is, for instance, arranged in the form of four mutually parallel, perforated plates which have a thickness of 50 mm each and a mutual spacing of 5 mm fron one another with resulting spaces between the perforated plates. The perforated plates are advantageously sintered bodies, which are provided with a multiplicity of passage openings which are arranged approximately parallel to each other. The sintered bodies consist advantageously of a highly porous material such as aluminum oxide or magnesium-aluminum silicate. The pore volume of the sintered body is 20 to 60 percent and preferably 40 to 50 percent. The passage openings, in the form of holes perpendicular to the surface, with a diameter, for intance, in the range of 0.1 to 2 mm, serve for the passage of the gas or the gas mixture, respectively, and extend in the flow direction of these gases. The passage openings, however, also transport the gases to the catalytically active centers in the free pores of the sintered bodies. The number of passage openings per cm² depends on their diameter. With a diameter of about 1 mm, 1 cm² of perforated plate surface has, for instance, about 40 holes.

The perforated plate adjacent to the inlet of the catalyst chamber contains as a catalyst, for instance, only platinum, while the remaining three perforated plates contain, for instance, a platinum-nickel mixed catalyst. The insertion of the catalyst into the catalyst carrier is accomplished in a manner known per se. The catalyst carrier can, for instance, be saturated with solutions of a nickel salt, a platinum salt or a platinum acid and the active metal can be produced subsequently by an aftertreatment in the catalyst carrier. The catalyst carrier, for instance, can be saturated with a solution of nickel (II) chloride, $NiCl_2$, and the salt can be converted by treatment with an alkali solution into nickel hydroxide $Ni(OH)_2$, which subsequently is converted to elemental nickel by reduction with hydrogen. For introducing platinum into the catalyst carrier, the latter can be saturated with an aqueous solution of hexachloroplatinic (IV) acid, $H_2(PtCl_6)$ and the acid can be reduced to platinum by hydrogen. In order to reduce the salt or the acid, respectively, the catalyst carrier is brought to an elevated temperature, for instance, under the action of a gas mixture of 10 percent hydrogen and 90 percent nitrogen. For a nickel catalyst, a catalyst charge of for instance 10 to 80 mg/cm³ of catalyst carrier is used, while for a platinum catalyst, the charge is for instance, 5 to 10 mg/cm³. If the catalyst is doped with uranium, the uranium content is about 1 to 3 percent by weight of the catalyst content.

As already explained, fuels without lead are used in the method of the invention. Simple distilled gasolines of low octane number, for instance, gasolines without additives or gasolines that have been subjected to no additional reforming processes, for increasing the octane number, are sufficient. Due to the simplified production processes, such gasolines are substantially cheaper than the gasolines normally used in combustion engines.

If, for instance, distilled gasoline, free of detrimental substances, with an average overall formula of $C_7H_{14}$ is used, such a fuel may contain, among other substances hexane and heptane, and if one adds to this fuel, exhaust gas and fresh air at a definite ratio, the following reaction takes place in the catalyst chamber of a device for carrying out the method according to the invention:

$$\underbrace{C_7H_{14}}_{\text{fuel (1g)}} + \underbrace{CO_2+H_2O+6N_2}_{\text{exhaust gas (1.83 liters)}} + \underbrace{1.5\ O_2+6N_2}_{\text{fresh air (1.71 liters)}} \longrightarrow$$

$$\underbrace{4CH_4+2CO+2CO_2+12N_2}_{\text{gas mixture (4.57 liters)}} + \text{approximately 29 kcal/Mol of fuel}$$

i.e., a weakly exothermic reaction takes place.

Fresh air is admixted to the gas mixture produced after leaving the catalyst chamber and this mixture is burned in an internal combustion engine, for instance, in an Otto motor. Here the reaction takes place:

$$\underbrace{4CH_4+2CO+2CO_2+12N_2}_{\text{gas mixture (4.57 liters)}} + \underbrace{9O_2+36N_2}_{\text{fresh air (10.29 liters)}} \longrightarrow$$

$$\underbrace{8CO_2+8H_2O+48N_2}_{\text{exhaust gas (14.03 liters)}}$$

In the internal combustion engine, 64 volume units of exhaust gas are therefore generated from 65 volume units of gas mixture and fresh air, and a theoretical combustion temperature of about 1,765° C is obtained in the combustion.

One can also see from the reaction equation above that exhaust gas and fresh air are advantageously admixed with the evaporated fuel in a ratio of 1:1 prior to entering the catalyst chamber. About 1.8 liter of exhaust gas and fresh air are used here, for instance, to 1 g of fuel. The ratio between exhaust gas and fresh air can also be chosen differently. To the gas mixture, leaving the catalyst chamber there is admixed, prior to entering the combustion engine, fresh air, preferably in such a quantity that a combustion as complete as possible is ensured in the combustion engine.

In the conventional combustion process in an internal combustion engine, the following reaction would take place, considered theoretically, if the same fuel is used, assuming complete combustion:

$$\underbrace{C_7H_{14}}_{\text{fuel}} + \underbrace{10.5O_2+42N_2}_{\text{fresh air}} \longrightarrow \underbrace{7CO_2+7H_2O+42N_2}_{\text{exhaust gas}}$$

From 53.5 volume units of fuel and fresh air, 56 volume units of exhaust gas would be produced here, with a resulting theoretical combustion temperature of about 1,990° C.

A comparison between the method according to the invention and the conventional method shows that the combustion temperature attainable by the method according to the invention is lower. If the same combustion engine is used, the attainable output is thereby reduced. This output reduction, compared with the conventional methods of burning fuels, directly, however, can be compensated for in the method according to the invention, at least partially by the provision that the gas mixture fed to the combustion engine has an octane number of about 110 and can, therefore, be compressed higher in the combustion engine, whereby an increase in output is obtained.

Beyond this, there is an advantageous effect in the method according to the invention, in that the exhaust gases, due to the low combustion temperature and the complete combustion of the gaseous fuel as compared to the conventional liquid fuel, i.e., gasolines, contain substantially less carbon monoxide.

In the conversion that takes place in the catalyst chamber, a gas mixture containing methane and carbon monoxide is produced from fuel, exhaust gas and fresh air. Other combustible components such as hydrogen are formed as intermediate products in the conversion of the fuel, but they are finally converted into methane. The temperature prevailing in the catalytic chamber is preferably in a range between 300° and 500° C, in order to assure this formation of methane. Higher temperatures could impair the methane formation and also lead to a loss of activity of the catalyst. Although the desired conversion still takes place at lower temperatures, down to about 150° C, the efficiency of the method of the invention could be reduced by an intensified formation of carbon dioxide and an impairment of the methane formation.

The reaction that takes place in the catalyst chambers occurs naturally only during the operation of the combustion engine according to the reaction equation given above. As an elevated temperature must prevail in the catalyst chamber for the conversion of the fuel, it is advisable to provide a starting aid for starting the combustion engine. The heat content of exhaust gases of an auxiliary burner can, for instance, be used to generate the temperature required in the catalyst chamber. Advantageously, a gasoline burner or a previously proposed catalytic high-temperature burner is used for this purpose. Starting up can, however, also be done in such a manner that the combustion engine is started directly with supplemental gasoline, with the catalyst chamber disconnected, or also with the fuel used for the conversion. With the last possibility, however, suitable precautions must be taken because of the low octane number of the fuel. The most favorable possibility of a starting aid is seen in igniting a mixture of evaporated fuel and oxygen containing gas such as fresh air, by an ignition device 19 arranged at the entrance of the catalytic chamber, for instance, by means of a hot tube or an ignition spark. In order to prevent the catalyst from heating up too fast, the catalytic chamber is fed a fresh air-fuel mixture with a large air deficiency. As a supplement for the temperature control, and for saving catalyst, there can be arranged with this kind of starting aid, prior to the catalyst carrier proper, i.e., ahead of the first perforated plate, a burner plate 20 in which the reaction between the fuel and the oxygen containing gas takes place at a temperature of about 500° to 600° C. This burner plate also feeds the hot reaction gases to the catalyst carrier. Such a burner plate can be about 15 mm thick, consist of the above-mentioned sintered body and contain platinum as the catalyst.

If the operating temperature is reached in the catalyst chamber, a part of the exhaust gas of the combustion motor is fed to the fuel - fresh air mixture prior to entering the catalytic chamber, as already explained, and the conversion is performed in the manner described.

In the method according to the invention, a gas turbine, for instance, can also be used as the combustion engine. In the operation of a gas turbine, the following reaction takes place in the catalytic chamber, which can be designed in the manner already described, if a fuel of the average overall formula $C_{16}H_{34}$ is used.

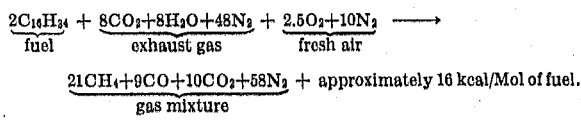

The reaction again is weakly exothermic.

In the gas turbine, after adding fresh air to this gas mixture, the following reaction takes place:

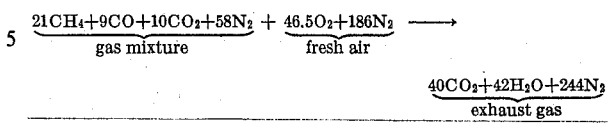

If the fuel mentioned were burned directly in a gas turbine, the following theoretically considered reaction would take place:

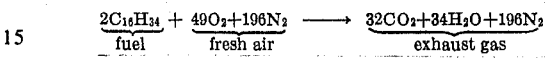

In the method according to the invention, there are produced in the gas turbine 326 volume units of exhaust gas from 330.5 volume units of gas mixture and fresh air, together with a theoretical combustion temperature of approximately 1,615° C. In a theoretical experiment of direct combustion of the fuel 262 volume units of exhaust gas would be produced from 247 volume units of fuel and fresh air, together with a theoretical combustion temperature of 1,965° C.

It is found that a lower combustion temperature is obtained with the method according to the invention than would be the case if the fuel were burned directly. However, in gas turbine, a lower combustion temperature has by no means an output reducing effect. To the contrary, a low combustion temperature is here desirable, as the allowable thermal stress of the turbine blades of the expansion turbine is at about 750° C. In carrying out the combustion process by the method of the invention, the efficiency is furthermore increased by the fact that for the same combustion temperature a more complete combustion can be attained as compared to direct combustion of the fuel.

The method according to the invention and the device for carrying out this method can advantageously find application in motor vehicles. Economical operation is assured by the possibility of miniaturization.

What is claimed is:

1. A method for the operation of combustion engines, which comprises passing a fuel free of detrimental substances and an admixture of oxygencontaining gas over catalytic material at elevated temperatures for catalytic conversion thereof into a gas mixture containing methane and carbon monoxide without forming carbon black, the fuel and oxygen-containing gas being guided through passages formed in highly porous sintered bodies containing the catalytic material and spaced one from the other in flow direction of the fuel and oxygen-containing gas, feeding the gas mixture obtained in the catalytic conversion together with fresh air to the combustion engine, burning the gas mixture in the combustion engine, and feeding part of the exhaust gases produced in the combustion engine to the fuel free of detrimental substances, prior to the catalytic conversion of the fuel.

2. The method of claim 1, wherein fresh air is added to the fuel free of detrimental substances, prior to the catalytic conversion of the fuel.

3. The method of claim 1, wherein a nickel catalyst, a platinum catalyst or a platinum-nickel mixed catalyst is used as the catalyst.

4. The method of claim 3, wherein a catalyst doped with uranium is used.

5. The method of claim 1, wherein the fuel gas mixture is fed over the catalyst at a temperature of 300° to 500° C.

6. The method of claim 1, wherein the heat required for the conversion of the fuel at the catalyst is supplied by utilizing the heat content of the exhaust gases leaving the combustion engine.

7. Method according to claim 1 wherein the fuel has a low octane number.

8. Method according to claim 1 wherein the oxygen-containing gas is air in an approximate given amount corresponding to about 14 percent of the quantity of air required for stoichiometric combustion of the fuel and, in addition to the given amount of air, admixing therewith and with the fuel an amount of the combustion engine exhaust gases that is approximately equal to the given amount of air.

9. Method according to claim 1 which comprises, at start-up of the combustion engine, applying the heat content of exhaust gas from a burner to the catalytic material so as to raise the temperature of the catalytic material to elevated temperature for catalytic conversion.

10. A device for the operation of combustion engines which comprises a catalytic chamber, a catalyst-containing porous catalyst carrier disposed in said catalytic chamber, said catalyst carrier comprising a plurality of highly porous sintered bodies spaced one from the other in flow direction of a mixture of fuel and oxygen-containing gas, said sintered bodies being formed with a multiplicity of passages for the fuel and gas mixture extending substantially parallel to one another, a pump for feeding the fuel, an evaporator for vaporizing the fuel having a mixing nozzle for mixing evaporated fuel with the oxygen-containing gas, said pump and said evaporator being located in said flow direction sequentially ahead of and communicating with an entrance to said catalytic chamber, said catalytic chamber also having an exit, a further mixing nozzle for mixing with fresh air the gaseous product obtained by catalysis of the evaporated fuel and the oxygen-containing gas in said catalytic chamber, said further mixing nozzle extending from said exit and being connectible to a combustion engine.

11. Device according to claim 10 including heat exchanger means located adjacent said catalytic chamber and said evaporator, said heat exchanger means being connectible to the exhaust discharge of the combustion engine for passing hot exhaust gases therethrough to heat said catalytic chamber and said evaporator.

12. Device according to claim 10 wherein at least the closest sintered body to said entrance to said catalytic chamber contains a catalyst differing from that contained in the next succeeding sintered bodies in direction of flow of the fuel and gas mixture.

13. Device according to claim 10 wherein said plurality of sintered bodies comprises a first sintered body located closest to said entrance to said catalytic chamber and containing platinum as catalyst, and three succeeding sintered bodies in flow direction of the fuel and gas mixture containing a platinum-nickel mixed catalyst.

14. Device according to claim 10 comprising an ignition device located at said entrance to said catalytic chamber, and a burner plate disposed adjacent to and upstream of the sintered body closest to said entrance in flow direction of the fuel and gas mixture.

* * * * *